United States Patent
Wang et al.

(10) Patent No.: US 12,524,037 B2
(45) Date of Patent: Jan. 13, 2026

(54) TIMESTAMP-FREE SYNCHRONIZATION CLOCK PARAMETER TRACKING METHOD BASED ON EXTENDED KALMAN FILTER

(71) Applicant: CHONGQING UNIVERSITY OF POSTS AND TELECOMMUNICATIONS, Chongqing (CN)

(72) Inventors: Heng Wang, Chongqing (CN); Zhengcen Peng, Chongqing (CN); Rui Lu, Chongqing (CN); Xi Guo, Chongqing (CN); Ping Wang, Chongqing (CN)

(*) Notice: Subject to any disclaimer, the term of this patent is extended or adjusted under 35 U.S.C. 154(b) by 61 days.

(21) Appl. No.: 17/791,920

(22) PCT Filed: Feb. 18, 2022

(86) PCT No.: PCT/CN2022/076843
§ 371 (c)(1),
(2) Date: Jul. 11, 2022

(87) PCT Pub. No.: WO2022/267496
PCT Pub. Date: Dec. 29, 2022

(65) Prior Publication Data
US 2024/0201728 A1 Jun. 20, 2024

(30) Foreign Application Priority Data
Jun. 25, 2021 (CN) .......................... 202110710014.2

(51) Int. Cl.
*G06F 1/12* (2006.01)
*G06F 17/11* (2006.01)
*G06F 18/20* (2023.01)

(52) U.S. Cl.
CPC .............. *G06F 1/12* (2013.01); *G06F 17/11* (2013.01); *G06F 18/295* (2023.01)

(58) Field of Classification Search
CPC ........... G06F 1/12; G06F 18/295; G06F 17/11
(Continued)

(56) References Cited

U.S. PATENT DOCUMENTS

| 4,809,005 A | * | 2/1989 | Counselman, III | G01S 19/35 342/357.48 |
| 10,475,415 B1 | * | 11/2019 | Gatson | G06F 3/013 |

(Continued)

FOREIGN PATENT DOCUMENTS

| CN | 102819830 A | 12/2012 |
| CN | 108668356 A | 10/2018 |

(Continued)

OTHER PUBLICATIONS

Office Action of corresponding CN application 202110710014.2, published on Jan. 26, 2022.
(Continued)

*Primary Examiner* — Paul R. Myers
(74) *Attorney, Agent, or Firm* — Michael D. Eisenberg; MDE Patents (57) ABSTRACT

The present invention relates to a timestamp-free synchronization clock parameter tracking method based on extended Kalman filter, and belongs to the technical field of wireless sensor networks. With a first order Gauss Markov model and a clock model as a state equation, evolution processes of clock skew and instantaneous clock offset is described. Then an observation equation constituted by observation models of timestamp-free synchronization and instantaneous clock offset is established, and clock skew and instantaneous clock offset are jointly tracked by a tracking method based on extended Kalman filter to realize synchronization between a node to be synchronized and a reference clock node. The method can track two time-varying parameters simultaneously by following a network data flow without needing a
(Continued)

dedicated synchronization frame to exchange synchronization information, which reduces energy consumption and improves synchronization precision.

4 Claims, 4 Drawing Sheets

(58) Field of Classification Search
 USPC .......................................................... 713/400
 See application file for complete search history.

(56) References Cited

U.S. PATENT DOCUMENTS

| | | | |
|---|---|---|---|
| 2002/0196184 A1* | 12/2002 | Johnson | G01S 5/06 340/988 |
| 2011/0238307 A1* | 9/2011 | Psiaki | G01S 19/31 701/469 |
| 2012/0221244 A1* | 8/2012 | Georgy | G01S 19/47 701/472 |
| 2012/0320902 A1* | 12/2012 | Na | H04J 3/0673 370/350 |
| 2014/0372026 A1* | 12/2014 | Georgy | G01S 19/47 701/469 |
| 2016/0025844 A1* | 1/2016 | Mckitterick | G01S 7/4004 342/21 |
| 2017/0042425 A1 | 2/2017 | Ramlall | |
| 2020/0158862 A1* | 5/2020 | Mahmoud | G01S 13/931 |
| 2024/0037297 A1* | 2/2024 | Mehta | G06F 30/27 |

FOREIGN PATENT DOCUMENTS

| | | |
|---|---|---|
| CN | 110460553 A | 11/2019 |
| CN | 110572232 A | 12/2019 |
| CN | 111220946 A | 6/2020 |
| CN | 111556559 A | 8/2020 |
| WO | WO2015049480 A1 | 4/2015 |
| WO | WO2020212722 A1 | 10/2020 |

OTHER PUBLICATIONS

Notice of Grant of Patent Right of corresponding CN application 202110710014.2, published on Mar. 3, 2022.
The granted claims of corresponding CN application 202110710014.2.
Fei Yu, Research on Clock Synchronization Parameter Estimation Method Without Timestamp Interaction in Wireless Sensor Networks, China Excellent Master's Theses Full-text Database (Master's)—Information Science and Technology Series, Feb. 15, 2021, Chapter 4.
Qiang Lie, et al., AdaSynch: A General Adaptive Clock Synchronization Scheme Based on Kalman Filter for WSNs, IEEE Transactions on Wireless Communications, 63(1), Aug. 22, 2010, 217-239.
Heng Wang, et al., Clock Skew Estimation for Timestamp-Free Synchronization in Industrial Wireless Sensor Networks, IEEE Transactions on Industrial Informatics, 17(1), Feb. 20, 2020, 90-99.
Bernhard Etzlinger, et al., Timestamp Free Synchronization With Sub-Tick Accuracy in the Presence of Discrete Clocks, IEEE Transaction on Wireless Communications, 16(2), Nov. 17, 2016, 771-783.

* cited by examiner

TIMESTAMP-FREE SYNCHRONIZATION CLOCK PARAMETER TRACKING METHOD BASED ON EXTENDED KALMAN FILTER

FIELD OF INVENTION

The present invention belongs to the technical field of wireless sensor networks, and relates to a timestamp-free synchronization clock parameter tracking method based on extended Kalman filter.

BACKGROUND ART OF THE INVENTION

Because of the advantages such as low power consumption, easy deployment and low price, wireless sensor networks have been widely used, for example, for target tracking, data fusion and deterministic scheduling. The applications require nodes in networks to run on the same time reference, so the time synchronization technology is an important support technology for wireless sensor networks. Timestamp-free synchronization is a low power synchronization mechanism that can realize synchronization between nodes without the need of exchanging timestamps. Because no time information is transmitted during synchronization and the synchronization function is easy to embed in a network data flow, the synchronization mechanism has received extensive attention. Most of the current timestamp-free synchronization methods are designed based on the assumption that the clock skew parameter remains unchanged, but the clock skew of wireless sensor nodes is nonlinearly time-varying due to the influence of factors such as external environment and life of crystal oscillator. Although some schemes can track the clock skew parameter of timestamp-free synchronization, the estimation of the instantaneous clock offset parameter cannot be realized, which restricts the application of timestamp-free synchronization in actual wireless sensor networks.

DISCLOSURE OF THE INVENTION

In view of this, the purpose of the present invention is to provide a timestamp-free synchronization clock parameter tracking method based on extended Kalman filter. A first order Gauss Markov model and a clock model are used to model time-varying clock offset and skew, and a tracking method based on extended Kalman filter is used to realize joint tracking of timestamp-free synchronization instantaneous clock offset and clock skew. The whole tracking process follows a network data flow without needing a dedicated synchronization frame to transmit timestamp information. A node to be synchronized can realize long-term synchronization with a reference clock node according to the recorded timestamp and the known response time, which saves communication bandwidth and energy and improves synchronization precision.

To achieve the above purpose, the present invention provides the following technical solution:

A timestamp-free synchronization clock parameter tracking method based on extended Kalman filter, comprising the following steps:

S1: with time-varying parameter models as a state equation, describing evolution processes of clock skew and instantaneous clock offset, wherein the time-varying parameter models are a first order Gauss Markov model and a clock model;

S2: establishing an observation equation, and jointly tracking clock skew and instantaneous clock offset by a tracking method based on extended Kalman filter to realize synchronization between a node to be synchronized and a reference clock node, wherein the observation equation is constituted by observation models of timestamp-free synchronization and instantaneous clock offset.

Further, for the state equation in step S1, dynamically changing clock skew is considered as a random variable of which the characteristics are described with the first order Gauss Markov model, and the specific formula is as follows:

$$\rho[n] = m\rho[n-1] + u[n]$$

wherein $\rho[n]$ represents the clock skew of the node to be synchronized relative to the reference clock node at the $n^{th}$ sampling moment; m represents a coefficient less than and close to 1 and is assumed to be known; and $u[n]$ represents Gaussian driving noise with the mean value of 0 and the variance of $\sigma_u^2$;

The clock model is used to describe instantaneous clock offset, and the specific formula is as follows:

$$\theta[n] = \theta[n-1] + \rho[n]\tau[n]$$

wherein $\theta[n]$ represents the clock offset of the node to be synchronized relative to the reference clock node at the $n^{th}$ sampling moment; and $\tau[n]$ represents the sampling interval of a $n^{th}$ sample and is assumed to be a fixed value, i.e., $\tau[n] = \tau_0$;

The formulas of instantaneous clock offset and clock skew are combined to constitute a matrix form, thus obtaining a state equation as follows:

$$x[n] = Ax[n-1] + u[n]$$

wherein $x[n] = \begin{bmatrix} \theta[n] \\ \rho[n] \end{bmatrix}$, $A = \begin{bmatrix} 1 & m\tau_0 \\ 0 & m \end{bmatrix}$ and $u[n] = \begin{bmatrix} \tau_0 u[n] \\ u[n] \end{bmatrix}$.

Further, the step of establishing an observation equation in step S2 is as follows:

S21: in the $i^{th}$ synchronization round, carrying out timestamp-free exchange between the node to be synchronized and the reference clock node, with the general synchronization formula as follows:

$$\Delta_i = (1+\rho_i)[(T_{4,i} - T_{1,i}) - 2\delta - (v_i + \omega_i)]$$

wherein $\Delta_i$ is the response time of the reference clock node, $T_{1,i}$ and $T_{4,i}$ respectively represent the time for the node to be synchronized to send data packets and the time for the node to be synchronized to receive data packets, $\delta$ is a fixed delay of message transmission between two nodes, and $v_i$ and $\omega_i$ are random delays of uplink and downlink during message transmission and modeled as Gaussian distribution with the mean value of 0 and the variances of $\epsilon^2$ and $\sigma^2$;

S22: repeating step S21, subtracting the general formula of the $i^{th}$ round from the general formula of the $i+1^{th}$ round, and assuming clock skew to be unchanged for two consecutive rounds, i.e., $\rho_{i+1} = \rho_i$, wherein i is an odd number, and the observation model of timestamp-free synchronization is obtained as follows:

$$\underbrace{\Delta_{i+1} - \Delta_i}_{\Delta'_j} = (1+\rho_i)\left[\underbrace{S_{i+1} - S_i}_{S'_j} - \left(\underbrace{w_{i+1} - w_i}_{w'_j}\right)\right]$$

wherein $$j = \frac{i+1}{2},$$

i is an odd number, $S_i=T_{4,i}-T_{1,i}$, and $w_i=v_i+\omega_i$;

S23: after sampling, obtaining the discrete observation model of timestamp-free synchronization of the node to be synchronized as follows:

$$S'[n] = \frac{1}{1+\rho^{(AR)}[n]}\Delta'[n] + w'[n]$$

wherein S'[n] is an observed value at the $n^{th}$ sampling moment, $\rho[n]$ represents clock skew at the $n^{th}$ sampling moment, w'[n] represents observation noise at the $n^{th}$ sampling moment, and $\Delta'[n]=\Delta_{i+1}-\Delta_i$;

S24: the observed value of instantaneous clock offset is comprised of a true value and noise, instantaneous clock offset in the state equation is the true value, and the observation model of instantaneous clock offset is written as: $\bar{\theta}[n]=\theta[n]+\upsilon[n]$, wherein $\bar{\theta}[n]$ is an observed value of instantaneous clock offset, and $\upsilon[n]$ represents Gaussian observation noise with the mean value of 0 and the variance of $\sigma_\upsilon^2$;

Combining the discrete observation model of timestamp-free synchronization and the observation model of instantaneous clock offset, thus obtaining an observation equation as follows:

$$R[n] = h(x[n]) + W[n] \text{ wherein } R[n] = \begin{bmatrix} \bar{\theta}[n] \\ S'[n] \end{bmatrix},$$

$$h(x[n]) = \begin{bmatrix} \theta[n] \\ \frac{\Delta'[n]}{1+\rho[n]} \end{bmatrix} \text{ and } W[n] = \begin{bmatrix} \upsilon[n] \\ w'[n] \end{bmatrix};$$

S25: the observed value in the observation equation and a state value of clock skew between nodes have non-linear relation, so clock parameters are tracked by extended Kalman filter rather than ordinary Kalman filter, the observation equation is linearized before the use of the tracking method based on extended Kalman filter, and the specific steps are as follows S251: carrying out first order Taylor series expansion of $$h(x[n]) = \begin{bmatrix} \theta[n] \\ \frac{\Delta'[n]}{1+\rho[n]} \end{bmatrix};$$

$$h(x[n]) \approx h(\hat{x}[n|n-1]) + \frac{\partial h}{\partial x[n]}\bigg|_{x[n]=\hat{x}[n|n-1]} (x[n] - \hat{x}[n|n-1])$$

S252: respectively taking derivatives of $\theta[n]$ and $\rho[n]$ by h(x[n]), and solving a Jacobi matrix as follows:

$$H[n] = \frac{\partial h}{\partial x[n]} = \begin{bmatrix} 1 & 0 \\ 0 & \frac{-\Delta'[n]}{(1+\rho[n])^2} \end{bmatrix}\bigg|_{x[n]=\hat{x}[n|n-1]}$$

S253: rewriting the observation equation as follows:

$R[n]=H[n]x[n]+W[n]+(h(\hat{x}[n|n-1])-H[n]\hat{x}[n|n-1])$.

Further, the step of jointly tracking clock skew and instantaneous clock offset by a tracking method based on extended Kalman filter in step S2 specifically comprises:

Recording a timestamp of timestamp-free exchange by the node to be synchronized, calculating an observed value according to the timestamp, and jointly tracking instantaneous clock offset and clock skew by the tracking method based on extended Kalman filter in combination with predicted values of state models of clock skew and offset, wherein the formula of extended Kalman filter is as follows:

Prediction: $\hat{x}[n|n-1]=A\hat{x}[n-1|n-1]$

Predicted minimum mean square error:
$M[n|n-1]=AM[n-1|n-1]A^T+C_s$

Kalman Gain:

$$K[n] = \frac{M[n|n-1]H^T[n]}{C_o + H[n]M[n|n-1]H^T[n]}$$

Correction: $\hat{x}[n|n]=\hat{x}[n|n-1]+K[n](R[n]-h(\hat{x}[n|n-1]))$

Minimum mean square error: $M[n|n]=(I-K[n]H[n])M[n|n-1]$ wherein $\hat{x}[n|n-1]$ represents a predicted value matrix of instantaneous clock offset and clock skew at the $n^{th}$ sampling moment, A is an update coefficient matrix, M[n|n−1] represents a predicted minimum mean square error matrix at the $n^{th}$ sampling moment, $$C_s = \begin{bmatrix} \tau_0^2\sigma_u^2 & \tau_0\sigma_u^2 \\ \tau_0\sigma_u^2 & 0 \end{bmatrix}$$

represents a covariance matrix of driving noise, K[n] represents a Kalman gain matrix at the $n^{th}$ sampling moment, H[n] represents a Jacobi matrix at the $n^{th}$ sampling moment, $$C_o = \begin{bmatrix} \sigma_\upsilon^2 & 0 \\ 0 & \sigma_{\omega'}^2 \end{bmatrix}$$

is a covariance matrix of observation noise, $\hat{x}[n|n]$ represents a corrected value matrix of corrected instantaneous clock offset and clock skew at the $n^{th}$ sampling moment, R[n] represents an observed value matrix at the $n^{th}$ sampling moment, h($\hat{x}[n|n-1]$) represents a transformation matrix from state variables to ideal observation of instantaneous clock offset and clock skew at the $n^{th}$ sampling moment, and M[n|n] represents a corrected minimum mean square error matrix at the $n^{th}$ sampling moment.

Further, the joint tracking method of clock skew and instantaneous clock offset of sensor nodes based on extended Kalman filter for timestamp-free exchange comprises the following specific steps:

D1: starting a clock parameter tracking process;
D2: initializing an extended Kalman filter;
D3: carrying out timestamp-free exchange between the node to be synchronized and the reference clock node, and recording the respective time to receive and send data packets;
D4: judging whether the number of synchronization rounds is an odd number; if yes, entering flow D5; otherwise, entering flow D6;

D5: increasing the number of synchronization rounds by 1, and entering flow D3;

D6: calculating the observed value R[n] and the observation matrix H[n] according to the timestamp information and the known response time by the node to be synchronized, predicting a first parameter state vector $\hat{x}[n|n-1]$ at moment n based on values of clock skew and offset at moment n−1 according to the state equation, and finally calculating the predicted minimum mean square error;

D7: calculating Kalman gain according to the observation matrix H[n];

D8: calculating corrected values and minimum mean square errors of instantaneous clock offset and clock skew at moment n according to Kalman gain and the observed value R[n];

D9: judging whether the number of synchronization rounds reaches a predicted value; if no, entering flow D10; otherwise, entering flow D11;

D10: increasing the number of synchronization rounds by 1, and entering flow D3;

D11: ending the tracking process of instantaneous clock offset and dynamic clock skew.

The present invention has the following beneficial effects:

1) In the clock parameter tracking process of the present invention, no dedicated synchronization frame is required to exchange timestamp information, the node to be synchronized tracks clock parameters by recording timestamps for receiving and sending data packets, and the synchronization function can be embedded into the existing network flow, which avoids waste of communication bandwidth and reduces energy consumption.

2) Considering dynamic changes of clock offset and skew caused by facts that clock offset and skew cannot be tracked simultaneously in the scenario of timestamp-free synchronization and that node crystal oscillators cannot operate at a stable frequency, the present invention adopts the tracking method based on extended Kalman filter to realize joint tracking of timestamp-free synchronization instantaneous clock offset and clock skew, which improves synchronization precision between nodes and reduces resynchronization frequency.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solution and the advantages of the present invention to be more clear, the present invention will be preferably described in detail below in combination with the drawings, wherein.

DETAILED DESCRIPTION OF THE INVENTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference numerals in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

Figure 1:
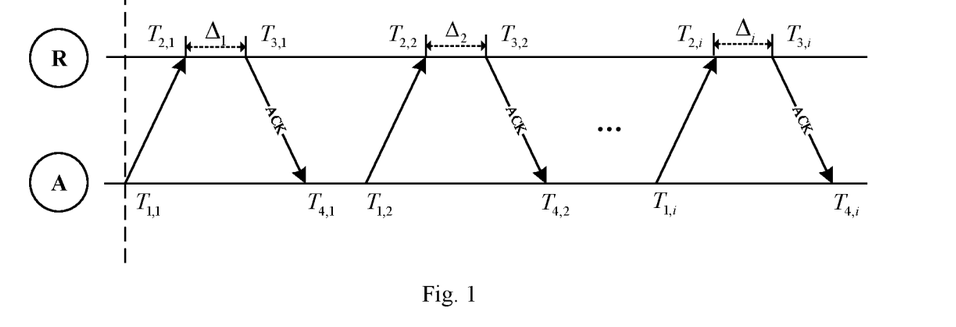
FIG. 1 is a schematic diagram of timestamp-free synchronization of a node to be synchronized and a reference clock node of the present invention.

With reference to FIG. 1-FIG. 6, FIG. 1 is a schematic diagram of timestamp-free synchronization provided by the present invention, wherein the node R is a reference clock node providing reference time, the node A is a node to be synchronized, which is synchronized with the node R through timestamp-free exchange, and the specific steps are as follows:

In the $i^{th}$ synchronization round, the node A to be synchronized sends data packets containing no timestamp information to the reference clock node R and records the time as $T_{1,i}^{(A)}$, the time when the reference clock node R receives the data packets is recorded as $T_{2,i}$, and the implementation model of $T_{2,i}$ can be expressed as follows:

$$T_{2,i} = T_{1,i} + \theta_i + \delta + \omega_i + \rho_i(T_{1,i} - T_{1,1} + \delta + v_i) \quad (1)$$

wherein $\theta_i$ and $\rho_i$ respectively represent clock offset and skew between the node A and the node R, $\delta$ is a fixed delay in the data packet transmission process, and $v_i$ is a random delay in the data packet transmission process and is modeled as independent Gaussian distribution with the mean value of 0 and the variance of $\varepsilon^2$.

The reference clock node R waits for a period of fixed response time $\Delta_i$ after receiving the data packets and returns the data packets containing no timestamp at moment $T_{3,i}$, the node A receives the data packets at moment $T_{4,i}$, and the implementation model of $T_{3,i}$ can be expressed as follows:

$$T_{3,i}=T_{4,i}+\theta_i-\delta-\omega_i+\rho_i(T_{4,i}-T_{1,i}-\delta-\omega_i) \quad (2)$$

wherein $\delta$ and $\omega_i$ are respectively a fixed delay and a random delay in the data packet transmission process, and the random delay is modeled as independent Gaussian distribution with the mean value of 0 and the variance of $\sigma^2$. Formula (1) is subtracted from formula (2) to obtain a general formula as follows:

$$\Delta_i=(1+\rho_i)[(T_{4,i}-T_{1,i})-2\delta-(v_i+\omega_i)] \quad (3)$$

The general formula of the $i^{th}$ round is subtracted from the general formula of the $i+1^{th}$ round, and clock skew is assumed to be unchanged for two consecutive rounds, i.e., $\rho_{i+1}=\rho_i$, wherein i is an odd number. The observation model of timestamp-free synchronization is obtained as follows:

$$\underbrace{\Delta_{i+1}-\Delta_i}_{\Delta'_j}=(1+\rho_i)\left[\frac{S_{i+1}-S_i}{S'_j}-\left(\frac{w_{i+1}-w_i}{w_j}\right)\right] \quad (4)$$

wherein $$j=\frac{i+1}{2},$$

i is an odd number, $S_i=T_{4,i}-T_{1,i}$, and $w_i=v_i+\omega_i$.

After sampling, the discrete observation model of timestamp-free synchronization of the node to be synchronized A as follows:

$$S'[n]=\frac{1}{1+\rho[n]}\Delta'[n]+W[n] \quad (5)$$

wherein $S'[n]$ is an observed value at the $n^{th}$ sampling moment, $\rho[n]$ represents clock skew at the $n^{th}$ sampling moment, $W[n]$ represents observation noise at the $n^{th}$ sampling moment of the mean value, and $\Delta'[n]=\Delta_{i+1}-\Delta_i$.

The observed value of instantaneous clock offset is comprised of a true value and noise, offset in the state equation is the true value, and the observation model of instantaneous clock offset can be written as: $\tilde{\theta}[n]=\theta[n]+\upsilon[n]$, wherein $\tilde{\theta}[n]$ is an observed value of offset, and $\upsilon[n]$ represents Gaussian observation noise with the mean value of 0 and the variance of $\sigma_\upsilon^2$. The discrete observation model of timestamp-free synchronization and the observation model of instantaneous clock offset are combined, thus obtaining an observation equation as follows:

$$R[n]=h(x[n])+W[n] \quad (6)$$

wherein $$R[n]=\begin{bmatrix}\tilde{\theta}[n]\\S'[n]\end{bmatrix}, h(x[n])=\begin{bmatrix}\theta[n]\\ \dfrac{\Delta'[n]}{1+\rho[n]}\end{bmatrix},$$

and $$W[n]=\begin{bmatrix}\upsilon[n]\\ \omega'[n]\end{bmatrix}.$$

The observed value in the observation equation and a state value of clock skew between nodes have nonlinear relation, so clock parameters are tracked by extended Kalman filter rather than ordinary Kalman filter, the observation equation needs to be linearized before the use of the tracking method based on extended Kalman filter, and the specific steps are as follows:

(1): Carrying out first order Taylor series expansion of $$h(x[n])=\begin{bmatrix}\theta[n]\\ \dfrac{\Delta'[n]}{1+\rho[n]}\end{bmatrix}; \quad (7)$$

$$h(x[n])\approx h(\hat{x}[n|n-1])+\left.\frac{\partial h}{\partial x[n]}\right|_{x[n]=\hat{x}[n|n-1]}$$

$$(x[n]-\hat{x}[n|n-1])$$

(2): Respectively taking derivatives of $\theta[n]$ and $\rho[n]$ by $h(x[n])$, and solving a Jacobi matrix as follows $$H[n]=\frac{\partial h}{\partial x[n]}=\left.\begin{bmatrix}1 & 0\\ 0 & \dfrac{-\Delta'[n]}{(1+\rho[n])^2}\end{bmatrix}\right|_{x[n]=\hat{x}[n|n-1]} \quad (8)$$

(3): Rewriting the observation equation as follows:

$$R[n]=H[n]x[n]+W[n]+(h(\hat{x}[n|n-1])-H[n]\hat{x}[n|n-1]) \quad (9)$$

Due to the nonlinearity of a crystal oscillator and the influence of phase noise as well as external environment (temperature, humidity, pressure intensity, etc.), clock skew will change randomly with time. To accurately reflect the change of clock skew, the present invention considers clock skew as a random variable and models the variable by the first order Gauss Markov model, and the specific model is as follows:

$$\rho[n]=m\rho[n-1]+u[n] \quad (10)$$

wherein $\rho[n]$ represents the clock skew of the node A to be synchronized relative to the reference clock node R at the $n^{th}$ sampling moment; m represents a coefficient less than and close to 1 and is considered known; and u[n] represents Gaussian driving noise with the mean value of 0 and the variance of $\sigma_u^2$.

The clock model is used to describe instantaneous clock offset, and the specific model is as follows:

$$\theta[n]=\theta[n-1]+\rho[n]\tau[n] \quad (11)$$

wherein $\theta[n]$ represents the clock offset of the node A to be synchronized relative to the reference clock node R at the $n^{th}$ sampling moment; and $\tau[n]$ represents the sampling interval of a $n^{th}$ sample and is assumed to be a fixed value, i.e., $\tau[n]=\tau_0$.

The models of clock skew and offset are combined to constitute a matrix form, thus obtaining a state equation as follows:

$$x[n] = Ax[n-1] + u[n] \quad (12)$$

wherein $$x[n] = \begin{bmatrix} \theta[n] \\ \rho[n] \end{bmatrix},$$

$$A = \begin{bmatrix} l & m\tau_0 \\ 0 & m \end{bmatrix}$$

and $$u[n] = \begin{bmatrix} \tau_0 u[n] \\ u[n] \end{bmatrix}.$$

Based on the state equation (12) and the observation equation (9), the present invention uses the tracking method based on extended Kalman filter to jointly track clock skew and offset parameters, and the specific formula is as follows:

Prediction: $\hat{x}[n|n-1]=A\hat{x}[n-1|n-1]$ (13)

Predicted minimum mean square error:
$M[n|n-1]=AM[n-1|n-1]A^T+C_s$ (14)

Kalman Gain:

$$K[n] = \frac{M[n|n-1]H^T[n]}{C_0 + H[n]M[n|n-1]H^T[n]} \quad (15)$$

Correction: $\hat{x}[n|n]=\hat{x}[n|n-1]+K[n](R[n]-h(\hat{x}[n|n-1]))$ (16)

Minimum mean square error: $M[n|n]=(I-K[n]H[n])M[n|n-1]$ (17)

In order to verify the effectiveness of the timestamp-free synchronization clock parameter tracking method based on extended Kalman filter provided by the present invention, posterior Cramer-Rao Bounds (PCRBs) of clock skew and instantaneous clock offset are calculated according to the state equation and the observation equation.

$\mathrm{var}(\rho) \geq J[n]_{11}^{-1}$ (18)

$\mathrm{var}(\theta) \geq J[n]_{22}^{-1}$ (19)

wherein:

$J[n+1]=(C_s+AJ[n]^{-1}A^T)^{-1}+E_{x[n+1]}\{H[n+1]C_0^{-1}H[n+1]\}$ (20)

Embodiment

Figure 2:
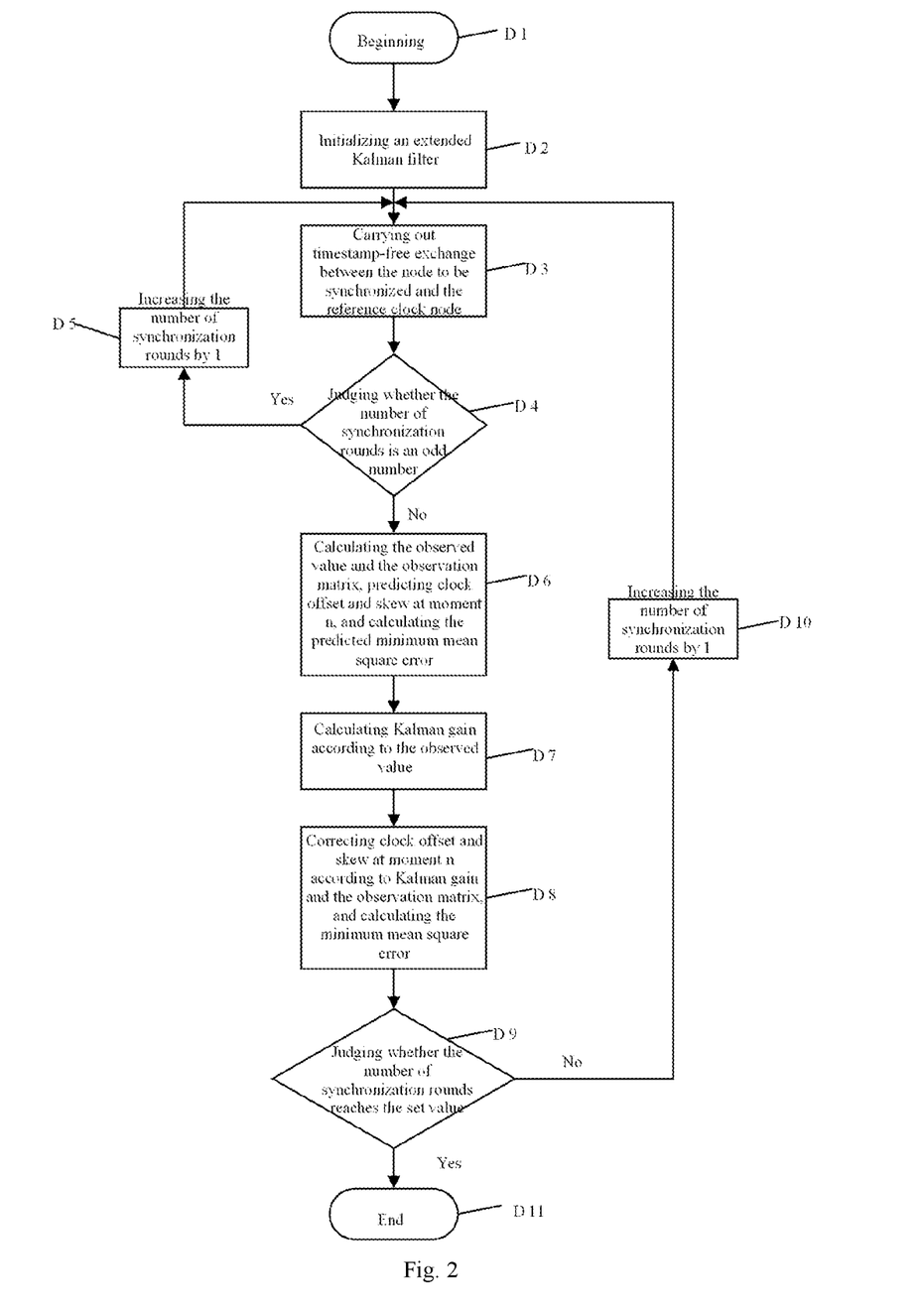
FIG. 2 is a flow chart of a timestamp-free synchronization clock parameter tracking method based on extended Kalman filter of the present invention.
Figure 3:
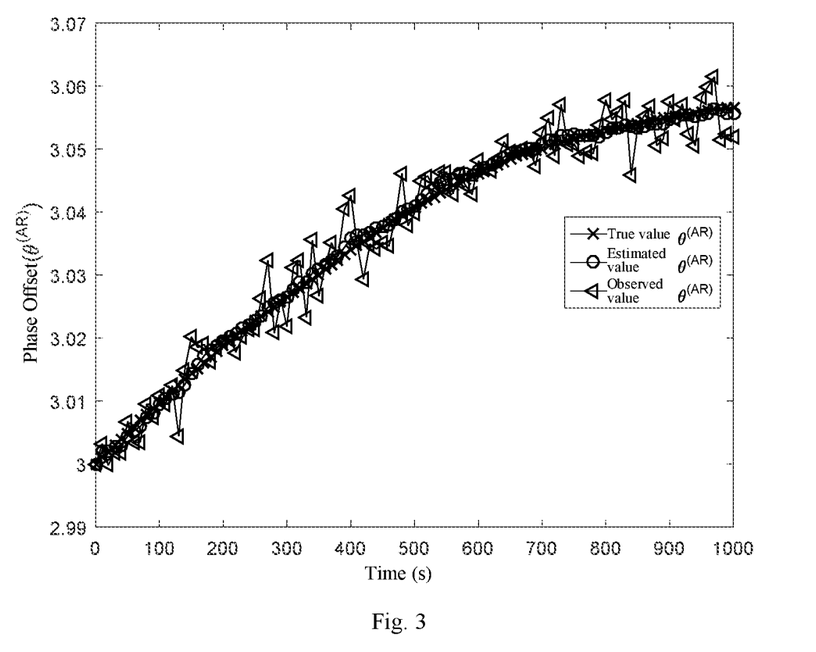
FIG. 3 is an effect diagram of timestamp-free synchronization instantaneous clock offset tracking based on extended Kalman filter of the present invention.
Figure 4:
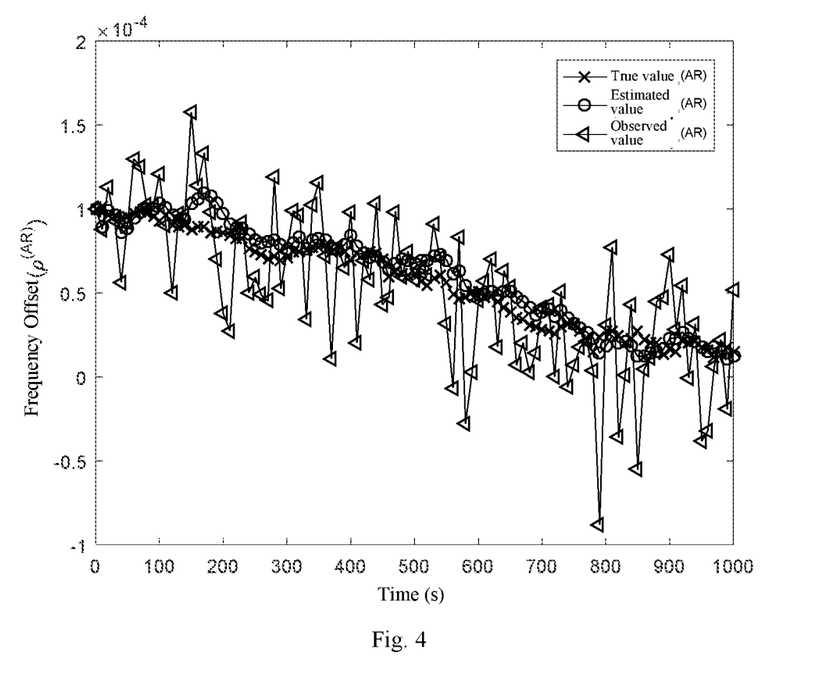
FIG. 4 is an effect diagram of timestamp-free synchronization clock skew tracking based on extended Kalman filter of the present invention.
Figure 5:
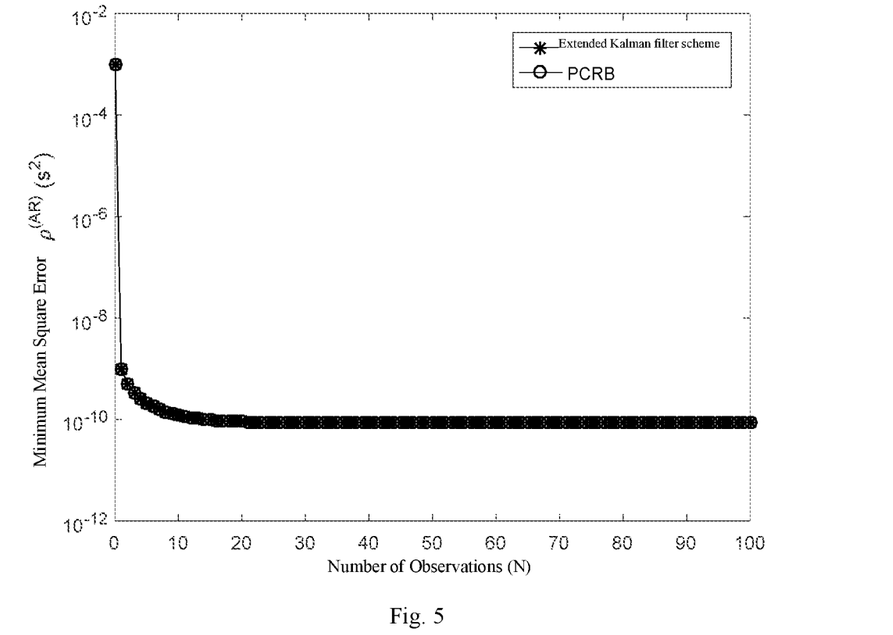
FIG. 5 is a performance comparison chart of a timestamp-free synchronization instantaneous clock offset tracking method based on extended Kalman filter of the present invention.
Figure 6:
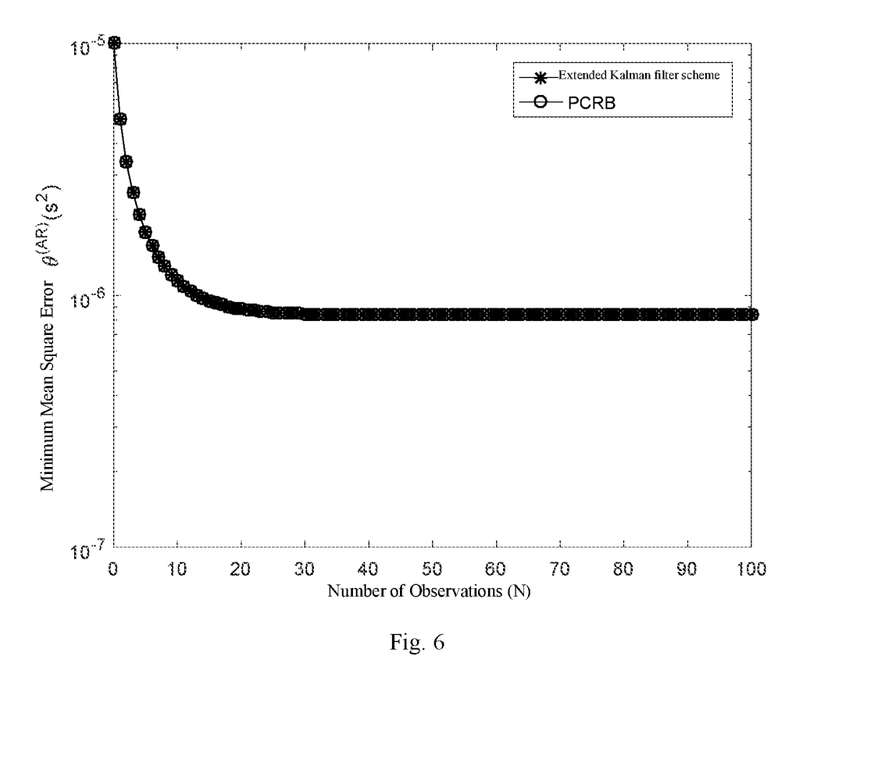
FIG. 6 is a performance comparison chart of a timestamp-free synchronization clock skew tracking method based on extended Kalman filter of the present invention.

FIG. 2 is a flow chart of a timestamp-free synchronization time-varying clock parameter tracking method provided by the embodiment of the present invention. The present embodiment provides a joint tracking method of clock skew and instantaneous clock offset of sensor nodes based on extended Kalman filter for timestamp-free exchange, as shown in FIG. 2, comprising the following specific steps:

D1: starting a clock parameter tracking process;
D2: initializing an extended Kalman filter;
D3: carrying out timestamp-free exchange between the node to be synchronized and the reference clock node, and recording the respective time to receive and send data packets;
D4: judging whether the number of synchronization rounds is an odd number; if yes, entering flow D5; otherwise, entering flow D6;
D5: increasing the number of synchronization rounds by 1, and entering flow D3;
D6: calculating the observed value R[n] and the observation matrix H[n] according to the timestamp information and the known response time by the node to be synchronized, predicting a first parameter state vector $\hat{x}[n|n-1]$ at moment n based on values of clock skew and offset at moment n−1 according to the state equation, and finally calculating the predicted minimum mean square error;
D7: calculating Kalman gain according to the observation matrix H[n];
D8: calculating corrected values and minimum mean square errors of instantaneous clock offset and clock skew at moment n according to Kalman gain and the observed value R[n];
D9: judging whether the number of synchronization rounds reaches a predicted value; if no, entering flow D10; otherwise, entering flow D11;
D10: increasing the number of synchronization rounds by 1, and entering flow D3;
D11: ending the tracking process of instantaneous clock offset and dynamic clock skew.

FIG. 3-FIG. 6 show diagrams of effects and performance comparison of timestamp-free synchronization clock parameter tracking based on extended Kalman filter provided by the present invention. It can be known from FIG. 3 and FIG. 4 that the tracking method based on extended Kalman filter can effectively track true values of time-varying clock skew and offset in the scenario of timestamp-free synchronization, which proves the reliability of the clock parameter tracking method provided by the present invention. It can be known from FIG. 5 and FIG. 6 that the performance of the tracking method of instantaneous clock offset and clock skew provided by the present invention can reach PCRB.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A timestamp-free synchronization clock parameter tracking method based on extended Kalman filter, characterized by comprising the following steps:

S1: with time-varying parameter models as a state equation, describing evolution processes of clock skew and instantaneous clock offset, wherein the time-varying parameter models are a first order Gauss Markov model and an iterative model of instantaneous clock offset;

wherein dynamically changing clock skew is considered as a random variable of which the characteristics are described with the first order Gauss Markov model, and the specific formula is as follows:

$\rho[n]=m\rho[n-1]+u[n]$ wherein $\rho[n]$ on represents the clock skew of the node to be synchronized relative to the reference clock node at the $n^{th}$ sampling moment; m represents a coefficient less than and close to 1 and is assumed to be known; and u[n] represents Gaussian driving noise with the mean value of 0 and the variance of $\sigma_u^2$;

the clock model is used to describe instantaneous clock offset, and the specific formula is as follows:

$$\theta[n]=\theta[n-1]+\rho[n]\tau[n]$$

wherein $\theta[n]$ represents the clock offset of the node to be synchronized relative to the reference clock node at the $n^{th}$ sampling moment; and $\tau[n]$ represents the sampling interval of a $n^{th}$ sample and is assumed to be a fixed value, i.e., $\tau[n]=\tau_0$;

the formulas of instantaneous clock offset and clock skew are combined to constitute a matrix form, thus obtaining a state equation as follows:

$$x[n]=Ax[n-1]+u[n]$$

$$\underbrace{\Delta_{i+1}-\Delta_i}_{\Delta'_j} = (1+\rho_i)\left[\underbrace{\frac{S_{i+1}-S_i}{s'_j}}_{} - \underbrace{\frac{(w_{i+1}-w_i)}{w'_j}}_{}\right]$$

S2: establishing an observation equation, and jointly tracking clock skew and instantaneous clock offset by a tracking method based on extended Kalman filter to realize synchronization between a node to be synchronized and a reference clock node, wherein the observation equation is constituted by observation models of timestamp-free synchronization and instantaneous clock offset.

2. The timestamp-free synchronization clock parameter tracking method based on extended Kalman filter as claimed in claim 1, characterized in that: the steps of establishing the observation equation in step S2 are as follows:

S21: in the $i^{th}$ synchronization round, carrying out timestamp-free exchange between the node to be synchronized and the reference clock node, with the general synchronization formula as follows:

$$\Delta_i=(1+\rho_i)[(T_{4,i}-T_{1,i})-2\delta-(v_i+\omega_i)]$$

wherein $\Delta_i$ is the response time of the reference clock node, $T_{1,i}$ and $T_{4,i}$ respectively represent the time for the node to be synchronized to send data packets and the time for the node to be synchronized to receive data packets, $\delta$ is a fixed delay of message transmission between two nodes, and $v_i$ and $\omega_i$ are random delays of unlink and downlink during message transmission and modeled as Gaussian distribution with the mean value of 0 and the variances of $\varepsilon^2$ and $\sigma^2$;

S22: repeating step S21, subtracting the general formula of the $i^{th}$ round from the general formula of the $i+1^{th}$ round, and assuming clock skew to be unchanged for two consecutive rounds, i.e., $\rho_{i+1}=\rho_i$, wherein $i$ is an odd number, and the observation model of timestamp-free synchronization is obtained as follows:

$$\underbrace{\Delta_{i+1}-\Delta_i}_{\Delta'_j} = (1+\rho_i)\left[\underbrace{\frac{S_{i+1}-S_i}{s'_j}}_{} - \underbrace{\frac{(w_{i+1}-w_i)}{w'_j}}_{}\right]$$

wherein $$j = \frac{i+1}{2},$$

$i$ is an odd number, $S_i=T_{4,i}-T_{1,i}$, and $w_i=v_i+\omega_i$;

S23: after sampling, obtaining the discrete observation model of timestamp-free synchronization of the node to be synchronized as follows:

$$S'[n] = \frac{1}{1+\rho^{(AR)}[n]} \Delta'[n] + w'[n]$$

wherein $S'[n]$ is an observed value at the $n^{th}$ sampling moment, $\rho[n]$ represents clock skew at the $n^{th}$ sampling moment, $w'[n]$ represents observation noise at the $n^{th}$ sampling moment, and $\Delta'[n]=\Delta_{i+1}-\Delta_i$;

S24: writing the observation model of instantaneous clock offset as: $\tilde{\theta}[n]=\theta[n]+\upsilon[n]$, wherein $\tilde{\theta}[n]$ is an observed value of instantaneous clock offset, and $\upsilon[n]$ represents Gaussian observation noise with the mean value of 0 and the variance of $\sigma_\upsilon^2$;

combining the discrete observation model of timestamp-free synchronization and the observation model of instantaneous clock offset, thus obtaining an observation equation as follows:

$$R[n] = h(x[n]) + W[n]$$

wherein $$R[n] = \begin{bmatrix} \tilde{\theta}[n] \\ S'[n] \end{bmatrix},$$

$$h(x[n]) = \begin{bmatrix} \theta[n] \\ \frac{\Delta'[n]}{1+\rho[n]} \end{bmatrix}$$

and $$W[n] = \begin{bmatrix} \upsilon[n] \\ w'[n] \end{bmatrix};$$

S25: tracking clock parameters by means of extended Kalman filter, and linearizing the observation equation before using the tracking method based on extended Kalman filter, with the specific steps as follows:

S251: carrying out first order Taylor series expansion of $$h(x[n]) = \begin{bmatrix} \theta[n] \\ \frac{\Delta'[n]}{1+\rho[n]} \end{bmatrix};$$

$$h(x[n]) \approx h(\hat{x}[n|n-1]) + \frac{\partial h}{\partial x[n]}\bigg|_{x[n]=\hat{x}[n|n-1]}$$

$$(x[n] - \hat{x}[n|n-1])$$

S252: respectively taking derivatives of $\theta[n]$ and $\rho[n]$ by $h(x[n])$, and solving a jacobi matrix as follows:

$$H[n] = \frac{\partial h}{\partial x[n]} = \begin{bmatrix} 1 & 0 \\ 0 & \frac{-\Delta'[n]}{(1+\rho[n])^2} \end{bmatrix}\bigg|_{x[n]=\hat{x}[n|n-1]}$$

S253: rewriting the observation equation as follows:

$$R[n]=H[n]x[n]+W[n]+(h(\hat{x}[n|n-1])-H[n]\hat{x}[n|n-1]).$$

3. The timestamp-free synchronization clock parameter tracking method based on extended Kalman filter as claimed in claim 2, characterized in that: the step of jointly tracking clock skew and instantaneous clock offset by a tracking method based on extended Kalman filter in step S2 specifically comprises:

recording a timestamp of timestamp-free exchange by the node to be synchronized, calculating an observed value according to the timestamp, and jointly tracking instantaneous clock offset and clock skew by the tracking method based on extended Kalman filter in combination with predicted values of state models of clock skew and offset, wherein the formula of extended Kalman filter is as follows:

Prediction: $\hat{x}[n|n-1]=A\hat{x}[n-1|n-1]$

Predicted minimum mean square error: $M[n|n-1]=AM[n-1|n-1]A^T+C$.

Kalman gain:

$$K[n] = \frac{M[n|n-1]H^T[n]}{C_o + H[n]M[n|n-1]H^T[n]}$$

Correction: $\hat{x}[n|n]=\hat{x}[n|n-1]+K[n](R[n]-h(\hat{x}[n|n-1])$

Minimum mean square error: $M[n|n]=(I-K[n]H[n])M[n|n-1]$ wherein $\hat{x}[n|n-1]$ represents a predicted value matrix of instantaneous clock offset and clock skew at the $n^{th}$ sampling moment, A is an update coefficient matrix, $M[n|n-1]$ represents a predicted minimum mean square error matrix at the $n^{th}$ sampling moment, $$C_s = \begin{bmatrix} \tau_0^2\sigma_u^2 & \tau_0\sigma_u^2 \\ \tau_o\sigma_u^2 & 0 \end{bmatrix}$$

represents a covariance matrix of driving noise, $K[n]$ represents a Kalman gain matrix at the $n^{th}$ sampling moment, $H[n]$ represents a jacobi matrix at the $n^{th}$ sampling moment, $$C_o = \begin{bmatrix} \sigma_v^2 & 0 \\ 0 & \sigma_{\omega'}^2 \end{bmatrix}$$

is a covariance matrix of observation noise, $\hat{x}[n|n]$ represents a corrected value matrix of corrected instantaneous clock offset and clock skew at the $n^{th}$ sampling moment, $R[n]$ represents an observed value matrix at the $n^{th}$ sampling moment, $h(\hat{x}[n|n-1])$ represents a transformation matrix from state variables to ideal observation of instantaneous clock offset and clock skew at the $n^{th}$ sampling moment, and $M[n|n]$ represents a corrected minimum mean square error matrix at the $n^{th}$ sampling moment.

4. The timestamp-free synchronization clock parameter tracking method based on extended Kalman filter of claim 1, 2 or 3, wherein the method comprises the following specific steps:

D1: starting a clock parameter tracking process;
D2: initializing an extended Kalman filter;
D3: carrying out timestamp-free exchange between the node to be synchronized and the reference clock node, and recording the respective time to receive and send data packets;
D4: judging whether the number of synchronization rounds is an odd number; if yes, entering flow D5; otherwise, entering flow D6;
D5: increasing the number of synchronization rounds by 1, and entering flow D3;
D6: calculating the observed value R[n] and the observation matrix H[n] according to the timestamp information and the known response time by the node to be synchronized, predicting a first parameter state vector $\hat{x}[n|n-1]$ at moment n based on values of clock skew and offset at moment n−1 according to the state equation, and finally calculating the predicted minimum mean square error;
D7: calculating Kalman gain according to the observation matrix H[n];
D8: calculating corrected values and minimum mean square errors of instantaneous clock offset and clock skew at moment n according to Kalman gain and the observed value R[n];
D9: judging whether the number of synchronization rounds reaches a predicted value; if no, entering flow D10; otherwise, entering flow D11;
D10: increasing the number of synchronization rounds by 1, and entering flow D3;
D11: ending the tracking process of instantaneous clock offset and dynamic clock skew.

* * * * *